US008249620B1

(12) United States Patent  
Mangiardi et al.

(10) Patent No.: US 8,249,620 B1
(45) Date of Patent: Aug. 21, 2012

(54) SYSTEM AND METHOD FOR OPERATING A COMMUNICATION SERVICE

(75) Inventors: Dominick Mangiardi, Fremont, CA (US); Abdolreza Asghari, Santa Clara, CA (US); Mark J. Bonn, Granite Bay, CA (US); ShouJei Cheng, Fremont, CA (US); James D. Kirby, San Mateo, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 810 days.

(21) Appl. No.: 12/254,993

(22) Filed: Oct. 21, 2008

(51) Int. Cl.
*H04W 24/00* (2009.01)

(52) U.S. Cl. ............... 455/456.1; 455/456.2; 455/456.3; 455/456.4; 455/414.1; 455/457

(58) Field of Classification Search .... 455/414.1–414.2, 455/456.1–457
See application file for complete search history.

(56) References Cited

U.S. PATENT DOCUMENTS

| | | | |
|---|---|---|---|
| 6,442,391 B1 | 8/2002 | Johansson et al. | |
| 6,542,749 B2 | 4/2003 | Tanaka et al. | |
| 7,203,502 B2 * | 4/2007 | Wilson et al. | 455/456.2 |
| 7,392,042 B2 * | 6/2008 | Bates et al. | 455/414.2 |
| 2004/0156326 A1 | 8/2004 | Chithambaram | |
| 2004/0203901 A1 * | 10/2004 | Wilson et al. | 455/456.1 |
| 2007/0149213 A1 | 6/2007 | Lamba et al. | |
| 2008/0274752 A1 * | 11/2008 | Houri | 455/456.1 |
| 2009/0197617 A1 * | 8/2009 | Jayanthi | 455/456.2 |

FOREIGN PATENT DOCUMENTS

WO 2005051033 6/2005

OTHER PUBLICATIONS

Google, "Organize Your Schedule and Share Events with Friends," Oct. 21, 2008, 1 page, google.com.
Helio LLC, "Exclusive Samsung Device Debuts GPS-enabled Google Maps for Mobile and Buddy Beacon," Nov. 9, 2006, 2 pages, helio.com, http://www.helio.com/page?p=press_release_detail&contentid=1163038493005.
Iyad Rahwan, et al., "Supporting Impromptu Coordination Using Automated Negotiation," Lecture Notes in Computer Science, Mar. 10, 2005, 2 pages, vol. 3371/2005, Springer Berlin/Heidelberg, springerlink.com, http://www.springerlink.com/content/hgv3xnj7avx1hcct/.
Loopt, "Loopt Mix," Oct. 21, 2008, 1 page, loopt.com, https://loopt.com/loopt/sess/index.aspx.
Microsoft, "Windows Calendar," Oct. 21, 2008, 3 pages, microsoft.com, http://www.microsoft.com/windows/products/windowsvista/features/details/calendar.mspx.
U.S. Appl. No. 10/265,980, filed Oct. 7, 2002.

* cited by examiner

*Primary Examiner* — Kiet Doan
*Assistant Examiner* — Michael T Vu

(57) ABSTRACT

A system and method are described. A communication interface receives a request that identifies a service and a first communication device. A location system determines a location of the first communication device and a location of a second communication device. A processing system processes the location of the first communication device and the location of the second communication device to determine if the first communication device is in the vicinity of the second communication device. In response to determining that the first communication device is in the vicinity of the second communication device, the processing system transfers a notification indicating that the first communication device is in the vicinity of the second communication device.

16 Claims, 7 Drawing Sheets

SYSTEM AND METHOD FOR OPERATING A COMMUNICATION SERVICE

TECHNICAL BACKGROUND

Modern technological advances have enabled many useful communication services. For instance, users operating mobile communication devices can automatically locate nearby places of interest, such as restaurants and movie theatres, and then access maps or directions to assist with navigating to the places of interest. In another example, users can locate their friends and acquaintances using instant messaging applications, among other applications.

Unfortunately, these applications typically require a great deal of familiarity beyond the common knowledge of many users. For instance, users may be required to navigate complex menus or highly detailed screens. In addition, these applications require vigilant monitoring by users, and are only useful when active. Lastly, for these applications to be truly useful, it is generally required that other users have the same applications running and active on their devices. Even obtaining and installing these applications can be a cumbersome and complex experience.

OVERVIEW

Generally described, a communication system and a method of operating a communication system for sending a notification to a communication device are provided herein.

In an example, a method comprises receiving a request that identifies a service and a first communication device, determining a location of the first communication device and a location of a second communication device, processing the location of the first communication device and the location of the second communication device to determine if the first communication device is in the vicinity of the second communication device, and, in response to determining that the first communication device is in the vicinity of the second communication device, transferring a notification indicating that the first communication device is in the vicinity of the second communication device.

In another example, a communication system comprises a user interface configured to receive a request that identifies a service and a first communication device, a location system configured to determine a location of the first communication device and a location of a second communication device, and a processing system configured to process the location of the first communication device and the location of the second communication device to determine if the first communication device is in the vicinity of the second communication device, wherein the user interface is further configured to, in response to determining that the first communication device is in the vicinity of the second communication device, transfer a notification indicating that the first communication device is in the vicinity of the second communication device.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
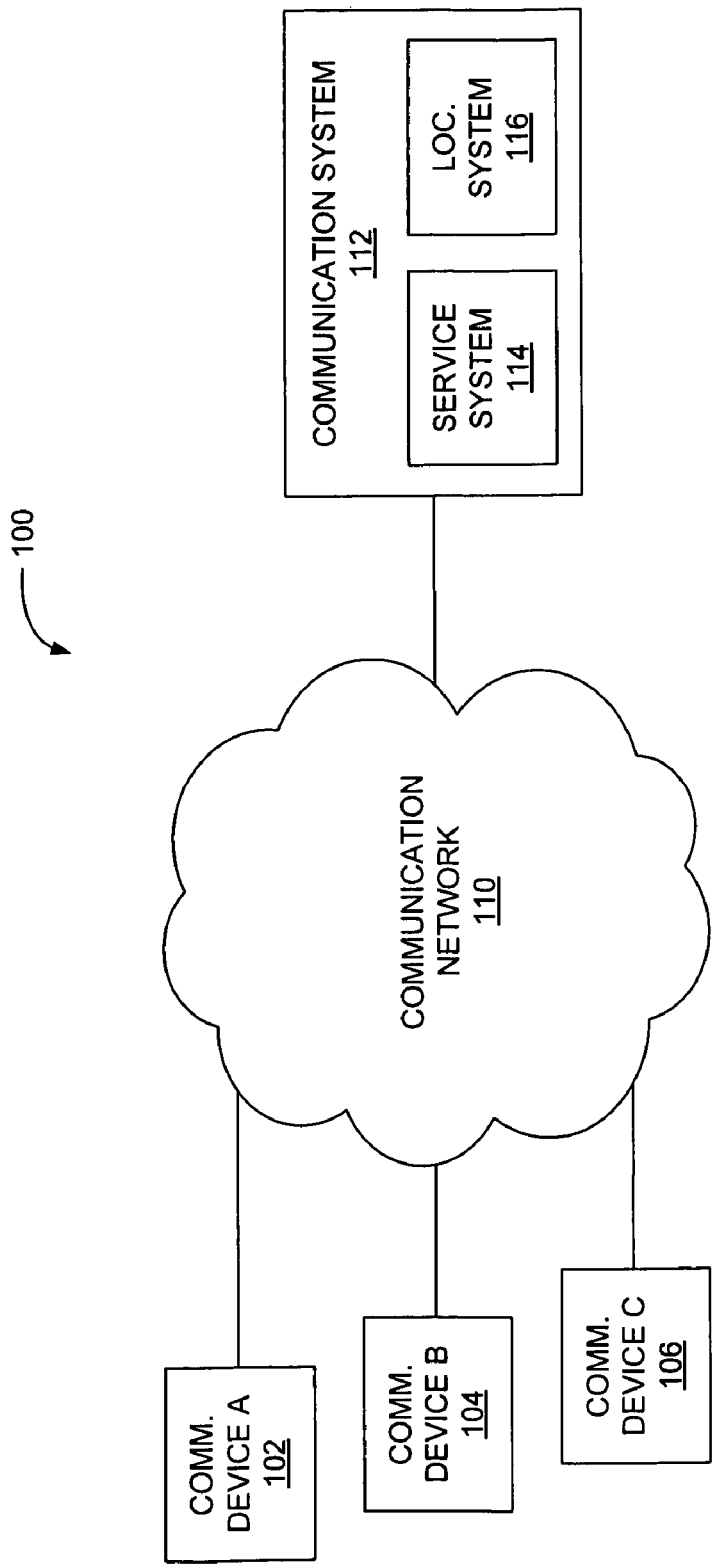
FIG. 1 is a block diagram that illustrates a communication system in a communication environment.

FIG. 1 is a block diagram that illustrates communication system 112 in communication environment 100. Communication environment 100 comprises communication device A 102, communication device B 104, communication device C 106, communication network 110, and communication system 112. Communication system 112 comprises service system 114 and location system 116. Communication network 110 is in communication with communication system 112. Communication device A 102, communication device B 104, and communication device C 106 are in communication with communication network 110.

Communication device A 102 is capable of transmitting and receiving data. Communication device A 102 comprises hardware and circuitry programmed to function as a telecommunications device. For example, communication device A 102 comprises a telephone, a wireless telephone, an Internet appliance, a personal digital assistant, a computer, a broadband modem, a cellular modem, a terminal adapter, or any other telecommunications device.

Communication device A 102 may be distributed among multiple devices that together comprise element 102. For example, communication device A 102 could comprise a telephone coupled to a Voice over Internet Protocol (VoIP) terminal adapter and a Worldwide Interoperability for Microwave Access (WiMAX) modem. Communication device B 104 and communication device C 106 are substantially similar to communication device A 102.

It will be understood that an environment such as communication environment 100 may include many more communication devices than the three communication devices 102, 104, and 106 shown in FIG. 1 and that many more than the three communication devices 102, 104 and 106 may be in communication with one or more communication networks 110. For the purpose of clarity only, a limited number of each such item has been shown herein.

Communication devices 102, 104, and 106 are connected to communication network 110. The connections between communication devices 102, 104, and 106 and communication network 110 may be either wired or wireless.

Communication network 110 is capable of providing a communication service to communication devices 102, 104 and 106. For example, communication network 110 could comprise a packet-switched network, such as the Internet, a cellular network, a public switched telephone network (PSTN), a Session Initiation Protocol (SIP) network, a PacketCable network, a Radio Access Network (RAN), an asynchronous transfer mode (ATM) network, a personal communication service (PCS) network, a local area network (LAN), a wide area network (WAN), a Voice over Internet Protocol (VoIP) network, or any other network that provides a communication service to a communication device. Moreover, communication network 110 could comprise any of the public switched data networks (PSDNs) such as an Internet Protocol network (Internet), Frame Relay, General Packet Radio Service (GPRS), Ethernet, and others.

Communication network 110 is connected to communication system 112. The link between communication network 110 and communication system 112 may be either a wired or wireless connection.

Communication system 112 comprises service system 114 and location system 116. Service system 114 comprises hardware and software capable of providing a notification service to communication devices 102, 104, and 106. Service system 114 is in communication with location system 116.

Location system 116 is capable of determining the locations of communication devices 102, 104, and 106. Location system 116 comprises hardware, software, and circuitry capable of locating communication devices 102, 104, and 106 in a multitude of ways. It will be understood that the location determination may comprise various methodologies, such as network-based, device-based, a hybrid of network-based and device-based, or simply retrieving location information from a database.

For example, location system 116 may determine the location of a communication device such as communication device A 102 by using satellite positioning techniques such as the Global Positioning System (GPS). Use of GPS to locate a communication device is an example of a device-based location method. By utilizing satellite location techniques such as GPS, location system 116 may determine the exact location of communication devices 102, 104, and 106. In addition, assisted-GPS or Locata technology may also be used.

In another example, location system 116 may determine the location of a communication device such as communication device A 102 by cell identification techniques, or enhanced cell identification techniques, which are examples of network-based location methods. For example, using Cell of Origin (COO), the serving cell location of a wireless device can be determined by the latitude and longitude along the azimuth of the sector serving the device at one third the maximum antenna range. Another example is control plane locating, where the location of a communication device is determined based on the radio signal delay of the closest base station transceivers.

In another example, location system 116 may determine the location of a communication device such as communication device A 102 by various means of multilateration of a signal from cell sites serving the communication device. The geographical position of a device may be determined through various techniques like Time of Arrival (TOA), Angle of Arrival (AOA), Time Difference of Arrival (TDOA) or Enhanced Observed Time Difference (E-OTD).

In another example, location system 116 may determine the location of a communication device such as communication device A 102 based on access into a telecommunications network, such as communication network 110. Location system 116 may acquire any information that is accessible from the network, such as a visited Mobile Switching Center (MSC). For example, location system 116 can determine if two or more communication devices are being served by the same MSC.

In another example, when power is supplied to communication device A 102 or communication device A 102 is turned on or activated, it may register with a telephone switch. Location system 112 may then determine the location by identifying the switch that communication device A 102 registered with.

In yet another example, location system 116 may determine the location of a communication device such as communication device A 102 by obtaining the device's location information from a database. An example of this is the exchange of the registration information used between a mobile device and a Home Location Register (HLR) database, which stores the location of a mobile device in mobile communication networks such as Code Division Multiple Access (CDMA) or Global System for Mobile communications (GSM) networks.

It will be understood that the foregoing communication environment 100 is illustrative only, and that many other arrangements of equipment, components, and interfaces can be used in lieu of those described above or may be omitted in their entirety. Those skilled in the art will understand and appreciate that much of the foregoing descriptions herein are functional in nature and may be implemented as hardware, firmware, or software as individual apparatus or in conjunction with other components, in any suitable combination, manner, and location.

Figure 2:
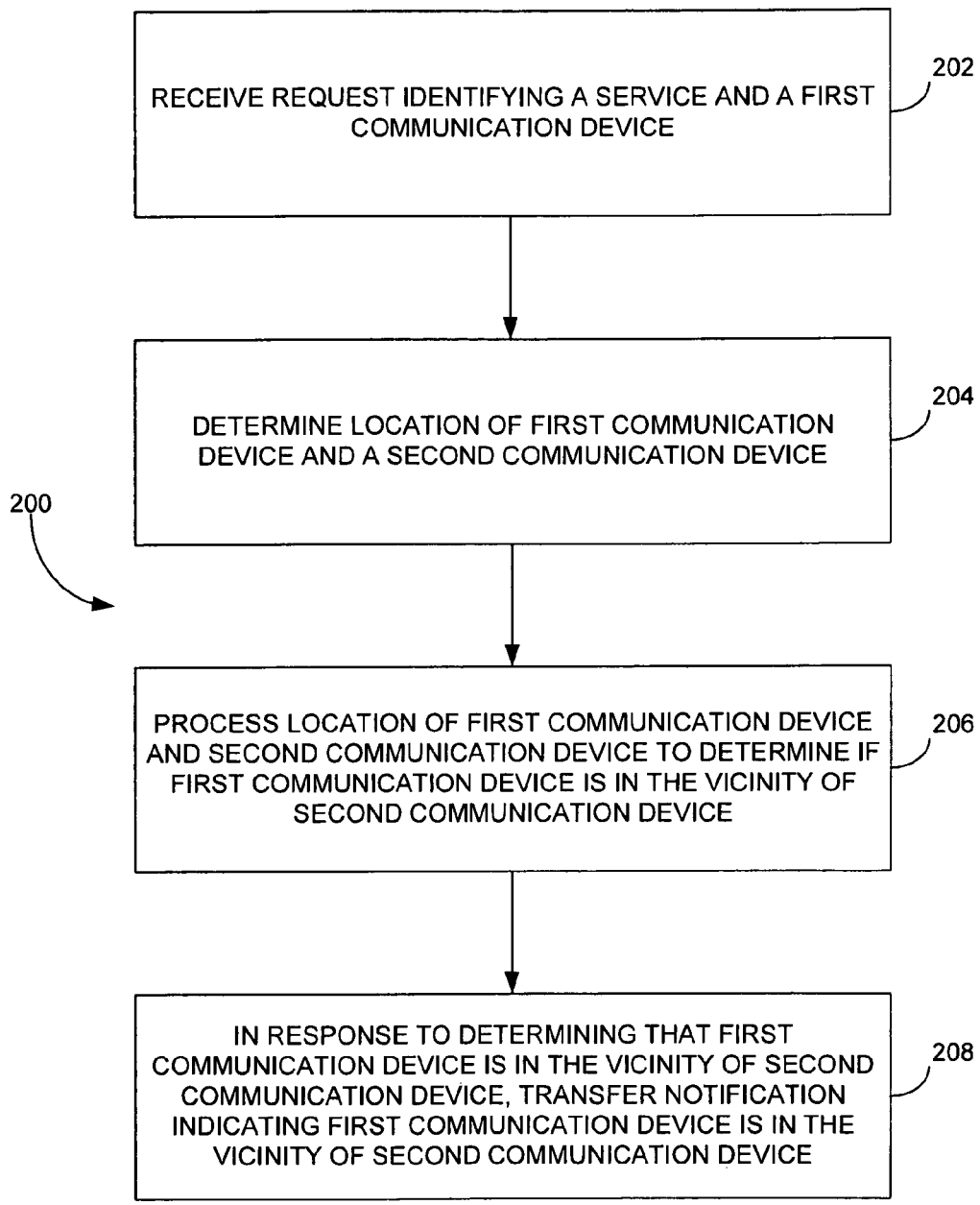
FIG. 2 is a flow diagram that illustrates a method of operating a communication system.

FIG. 2 is a flow diagram that illustrates a method 200 of operating communication system 112. Communication system 112 receives a request which identifies a service and a first communication device, communication device B 104 (operation 202). The request comprises a user of communication device A 102 enabling a data transmission for a communication link to a communication network, such as communication network 110. The service identified in the request is handled by service system 114.

Various options may be included in the request handled by service system 114. Examples of such options follow, and may be submitted individually or in combination. In one embodiment, the request comprises a duration of time for service system 114 to actively process the request. In another embodiment, the request comprises a start date for service system 114 to commence actively processing the request. In another embodiment, the request comprises a daily time frame for service system 114 to actively process the request. In another embodiment, the request comprises a vicinity that service system 114 will use in processing the request. In another embodiment, the request comprises a message to be sent to at least one other communication device. In another embodiment, the request comprises identifying one or more additional communication devices for service system 114 to actively process. It should be noted that a requesting party does not need to submit any of the above options with the request; the party may also specify or modify these options at any time after the request is made.

In response to receiving the request, service system 114 transfers the request to location system 112. Location system 112 then determines the location of the first communication device, communication device B 104, and a second communication device (operation 204). In one embodiment, the second communication device is the communication device that issued the request, communication device A 102. In another embodiment, the second communication device is another communication device identified in the request, communication device C 106.

It should be understood that location system 112 may determine the locations of the first communication device and the second communication device by a variety of methods. Some examples of such methods are detailed above in FIG. 1. The location determination may comprise various methodologies, such as network-based, device-based, a hybrid of network-based and device-based, or simply retrieving location information from a database.

After location system 112 has determined the location of the first communication device and the second communication device, location system 112 sends this location information to service system 114. Service system 114 then processes the location of the first communication device and the second communication device to determine if the first communication device is in the vicinity of the second communication device (operation 206).

The vicinity used in operation 206 may be determined in a variety of ways. In one embodiment, the vicinity is predetermined by service system 114. In another embodiment, receiving the request comprises receiving a submission of the vicinity. For example, a user of communication device A 102 submits the vicinity upon making the request in operation 202. In another embodiment, a method comprises, in response to receiving the request, prompting a user to input the vicinity. For example, service system 114 prompts a user of communication device A 102 to input the vicinity after receiving the request in operation 202. In another embodiment, a method comprises modifying the vicinity by receiving a new vicinity. For example, the requesting party may change the vicinity at any time by providing a new vicinity to service system 114.

The requesting party specifies a location range when specifying the vicinity. For example, the location range could comprise a governmental jurisdiction, such as a city or city block, county, or state. In another example, the location range could comprise a cell sector. In another example, the location range could comprise a distance, such as a two mile radius or one square mile.

In response to determining that the first communication device is in the vicinity of the second communication device, service system 114 transfers a notification to communication device A 102 indicating that the first communication device is in the vicinity of the second communication device. In one embodiment, the notification comprises an option for a user of communication device A 102 to send a message to the second communication device. In another embodiment, the notification comprises an option for a user of communication device A 102 to request confirmation from a user of the second communication device. In another embodiment, a notification is sent to every communication device identified in the initial request.

Various additional embodiments are contemplated herein. In one embodiment, service system 114 sends a notification indicating expiration of a duration. In another embodiment, service system 114 sends a notification indicating the distance between the first communication device and the second communication device, such as the closest proximity reached between the two communication devices. In another embodiment, service system 114 sends a notification indicating all active processing associated with a communication device. In another embodiment, a web interface is provided which displays all active processing associated with a communication device.

In one embodiment, service system 114 sends a Small Message Service (SMS) message displaying all active processing associated with a communication device. In another embodiment, service system 114 sends an SMS message to a communication device displaying all active processing initiated by that communication device. In another embodiment, service system 114 sends an SMS message to a communication device displaying all active processing initiated by any other communication device.

In another embodiment, service system 114 sends a notification suggesting new limitations. For example, service system 114 may suggest a larger value for the vicinity parameter upon determining that two or more communication devices have been close but were never actually within the set vicinity. In another embodiment, a tolerance for the vicinity may be set, allowing service system 114 a margin of error in making the vicinity determination.

Figure 3:
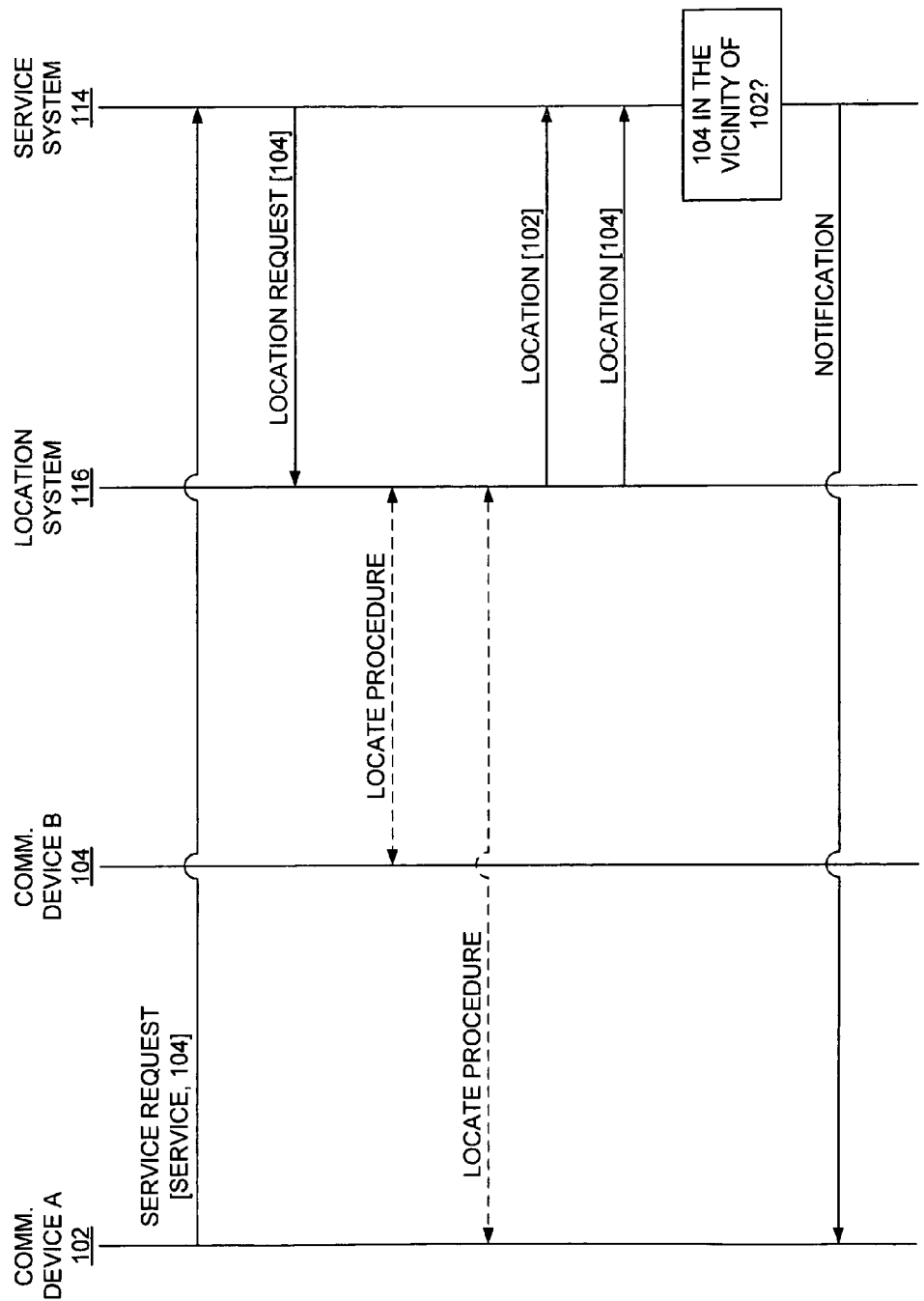
FIG. 3 is a sequence diagram that illustrates a method of operating a communication system.

FIG. 3 is a sequence diagram that illustrates a method of operating communication environment 100. A user of communication device A 102 desiring to meet with a user of communication device B 104 when they are both in the same vicinity could do so by employing the method of FIG. 3.

A user of communication device A 102 transmits a service request to service system 114 of communication system 112. The service request identifies a service and communication device B 104. While the service request described in FIG. 3 only identifies a single communication device, it should be noted that a service request could identify a plurality of communication devices. Responsive to receiving the service request, service system 114 transfers a location request to location system 116. The location request identifies communication device B 104.

Location system 116 activates a locate procedure for communication device B 104. While the sequence diagram in FIG. 3 depicts a connection from location system 116 to communication device B 104, the locate procedure is not limited only to device-based location methods. It should be understood that the locate procedure may comprise various location determination methods, such as network-based, device-based, a hybrid of network-based and device-based, or simply retrieving location information from a database. For example, when communication device B 104 is turned on or activated, it may register with a telephone switch, and location system 112 may determine the location by identifying the switch that communication device B 104 registered with, without communicating directly with communication device B 104.

Location system 116 activates a similar locate procedure for communication device A 102. Again, it should be noted that although the locate procedure depicted in FIG. 3 indicates a connection between location system 116 and communication device A 102, the locate procedure is not limited solely to device-based location methods. Every reference above and hereinafter to a locate procedure comprises at least every location determination method exemplified with regard to location system 116 in FIG. 1.

After location system 116 has acquired the location of communication device A 102, location system 116 transfers the location of communication device A 102 to service system 114. Similarly, the location of communication device B 104 is also transferred to service system 114.

Service system 114 then compares the location of communication device B 104 to the location of communication device A 102. If service system 114 determines that communication device B 104 is in the vicinity of communication device A 102, service system 114 sends a notification to communication device A 102. The notification sent to communication device A 102 indicates that communication device B 104 is in the vicinity of communication device A 102. In one embodiment, the notification is also sent to communication device B 104.

Figure 4:
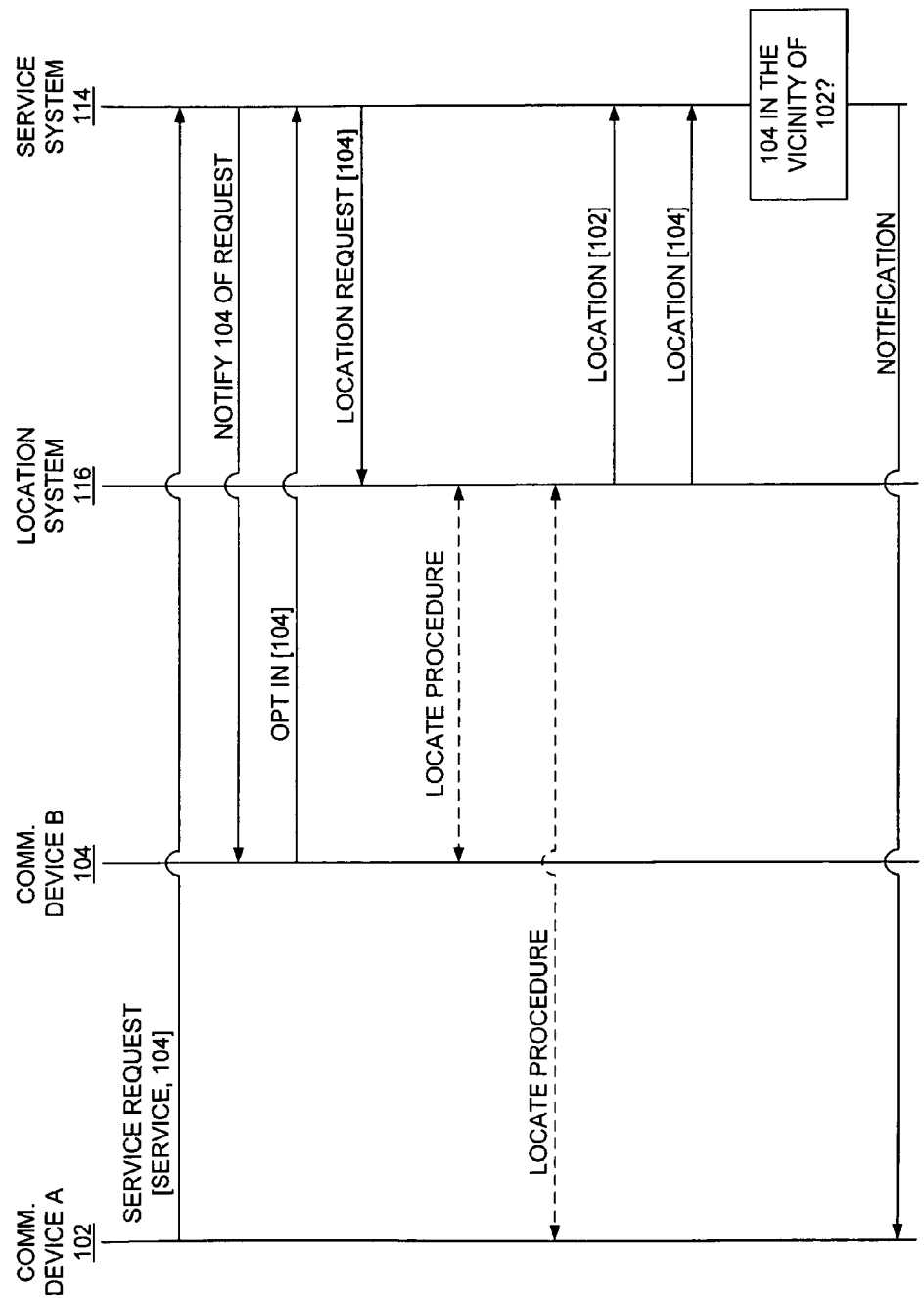
FIG. 4 is a sequence diagram that illustrates a method of operating a communication system.

FIG. 4 is a sequence diagram that illustrates a method of operating communication environment 100. A user of communication device A 102 desiring to meet with a user of communication device B 104 when they are both in the same vicinity could do so by employing the method of FIG. 4.

A user of communication device A 102 transmits a service request to service system 114 of communication system 112. The service request identifies a service and communication device B 104. While the service request described in FIG. 4 only identifies a single communication device, it should be noted that a service request could identify a plurality of communication devices. Responsive to receiving the service request, service system 114 transfers a notification to communication device B 104. The notification informs a user of communication device B 104 that a user of communication device A 102 has requested the service with regard to communication device B 104.

In one embodiment, the notification comprises the details of the request, including various options sent with the request such as a duration of time, a start date, a time frame during the day, and a vicinity that service system 114 will use in processing the request. In another embodiment, the notification comprises a message from a user of communication device A 102. In another embodiment, the notification identifies one or more additional communication devices that service system 114 will actively process.

In response to receiving the notification, a user of communication device B 104 is presented with the option to accept or decline the request. If a user of communication device B 104 opts in to the service, communication device B 104 transfers a notification to service system 114 indicating acceptance of the request. In one embodiment, service system 114 prompts a user of communication device B 104 to input a message to communication device A 102. For example, in one embodiment, a user of communication device B 104 may record a voice message to the user of communication device A 102. In another embodiment, a user of communication device B 104 enters a Short Message Service (SMS) text message.

In response to receiving a notification of acceptance from communication device B 104, service system 114 transfers a location request to location system 116. The location request identifies communication device B 104. In one embodiment, service system 114 also sends a notification to communication device A 102 indicating acceptance of the request by a user of communication device B 104. In another embodiment, service system 114 sends a message from a user of communication device B 104 to communication device A 102.

In response to receiving the location request from service system 114, location system 116 activates a locate procedure for communication device B 104. While the sequence diagram in FIG. 4 depicts a connection from location system 116 to communication device B 104, it should be understood that the locate procedure is not limited only to device-based location methods.

Location system 116 activates a similar locate procedure for communication device A 102. Again, it should be noted that although the locate procedure depicted in FIG. 4 indicates a connection between location system 116 and communication device A 102, the locate procedure is not limited solely to device-based location methods.

After location system 116 has acquired the location of communication device A 102, location system 116 transfers the location of communication device A 102 to service system 114. Similarly, the location of communication device B 104 is also transferred to service system 114.

Service system 114 then compares the location of communication device B 104 to the location of communication device A 102. If service system 114 determines that communication device B 104 is in the vicinity of communication device A 102, service system 114 sends a notification to communication device A 102. The notification sent to communication device A 102 indicates that communication device B 104 is in the vicinity of communication device A 102. In one embodiment, the notification is also sent to communication device B 104.

Figure 5:
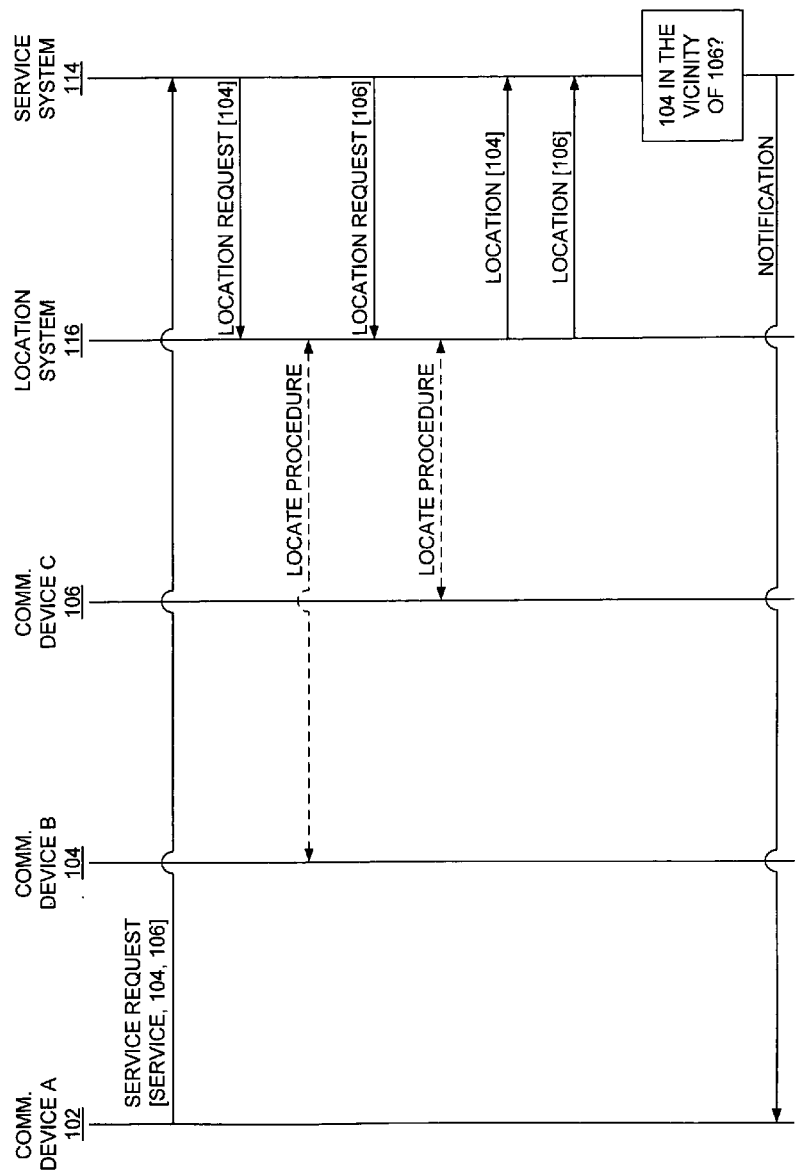
FIG. 5 is a sequence diagram that illustrates a method of operating a communication system.

FIG. 5 is a sequence diagram that illustrates a method of operating communication environment 100. A user of communication device A 102 desiring to be notified when two other communication devices are both in the same vicinity could do so by employing the method of FIG. 5.

A user of communication device A 102 transmits a service request to service system 114 of communication system 112. The service request identifies a service, communication device B 104, and communication device C 106. While the service request described in FIG. 5 only identifies two communication devices, it should be noted that a service request could identify any number of communication devices. Responsive to receiving the service request, service system 114 transfers a location request to location system 116. The location request identifies communication device B 104.

In response to receiving the location request from service system 114, location system 116 activates a locate procedure for communication device B 104. While the sequence diagram in FIG. 5 depicts a connection from location system 116 to communication device B 104, it should be understood that the locate procedure is not limited only to device-based location methods.

Also in Response to receiving the service request, service system 114 transfers another location request to location system 116. The location request identifies communication device C 106.

In response to receiving the location request from service system 114, location system 116 activates a similar locate procedure for communication device C 106. Again, it should be noted that although the locate procedure depicted in FIG. 5 indicates a connection between location system 116 and communication device C 106, the locate procedure is not limited solely to device-based location methods.

After location system 116 has acquired the location of communication device B 104 and the location of communication device C 106, location system 116 transfers the location of communication device B 104 and the location of communication device C 106 to service system 114.

Service system 114 then compares the location of communication device B 104 to the location of communication device C 106. If service system 114 determines that communication device B 104 is in the vicinity of communication device C 106, service system 114 sends a notification to communication device A 102. The notification sent to communication device A 102 indicates that communication device B 104 is in the vicinity of communication device C 106. In one embodiment, the notification is also sent to communication device B 104 or communication device C 106, or both.

Figure 6:
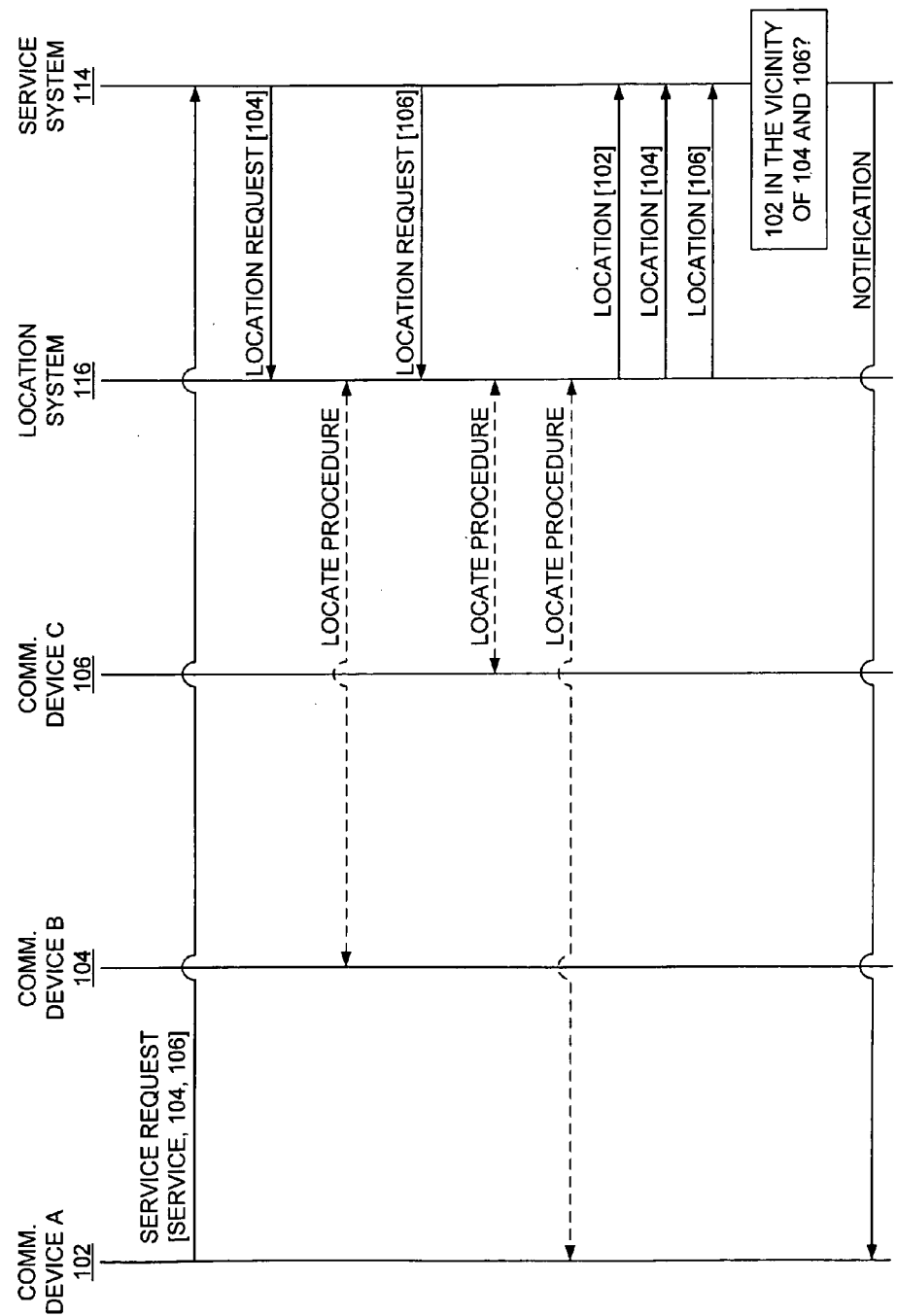
FIG. 6 is a sequence diagram that illustrates a method of operating a communication environment.

FIG. 6 is a sequence diagram that illustrates a method of operating communication environment 100. A user of communication device A 102 desiring to be notified when two other communication devices are both in the same vicinity as communication device A 102 could do so by employing the method of FIG. 6.

A user of communication device A 102 transmits a service request to service system 114 of communication system 112. The service request identifies a service, communication device B 104, and communication device C 106. While the service request described in FIG. 6 only identifies two communication devices, it should be noted that a service request could identify any number of communication devices. Responsive to receiving the service request, service system 114 transfers a location request to location system 116. The location request identifies communication device B 104.

In response to receiving the location request from service system 114, location system 116 activates a locate procedure for communication device B 104. While the sequence diagram in FIG. 6 depicts a connection from location system 116 to communication device B 104, it should be understood that the locate procedure is not limited only to device-based location methods.

Also in Response to receiving the service request, service system 114 transfers another location request to location system 116. The location request identifies communication device C 106.

In response to receiving the location request from service system 114, location system 116 activates a locate procedure for communication device C 106. Although the sequence diagram in FIG. 6 depicts a connection from location system 116 to communication device C 106, it should be understood that the locate procedure is not limited only to device-based location methods.

Location system 116 activates a similar locate procedure for communication device A 102. Again, it should be noted that although the locate procedure depicted in FIG. 6 indicates a connection between location system 116 and communication device A 102, the locate procedure is not limited solely to device-based location methods.

After location system 116 has acquired the locations of communication device A 102, communication device B 104, and communication device C 106, location system 116 transfers the locations of communication device A 102, communication device B 104, and communication device C 106 to service system 114.

Service system 114 then compares the location of communication device A 102 to the location of communication device B 104 and the location of communication device C 106. If service system 114 determines that communication device A 102 is in the vicinity of communication device B 104 and communication device C 106, service system 114 sends a notification to communication device A 102. The notification sent to communication device A 102 indicates that communication device A 102 is in the vicinity of communication device B 104 and communication device C 106. In one embodiment, the notification is also sent to communication device B 104 or communication device C 106, or both.

Figure 7:
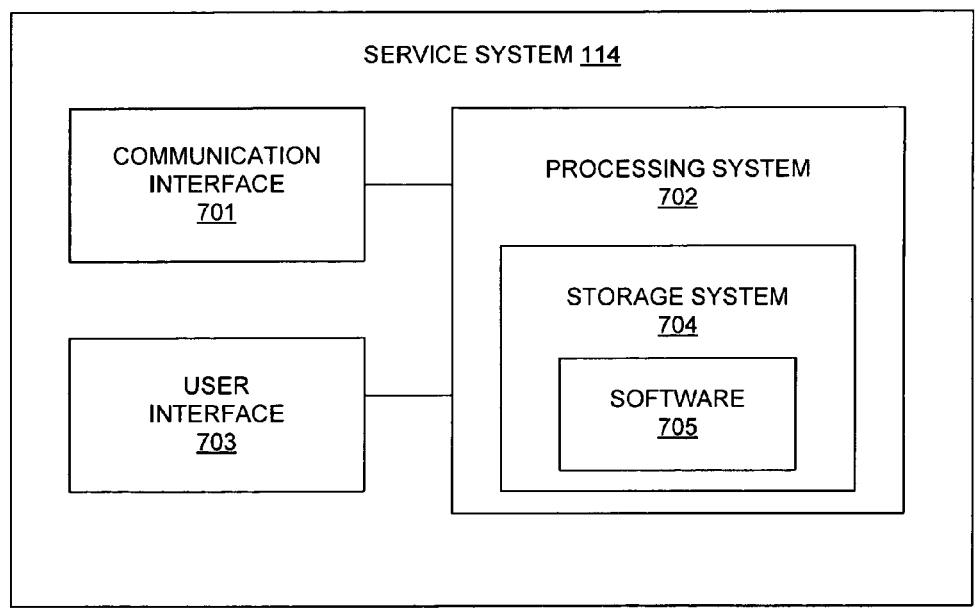
FIG. 7 is a block diagram that illustrates a service system.

FIG. 7 is a block diagram that illustrates service system 114. Service system 114 includes communication interface 701, processing system 702, and user interface 703. Processing system 702 includes storage system 704. Storage system 704 stores software 705. Processing system 702 is linked to communication interface 701 and user interface 703. Service system 114 could be comprised of a programmed general-purpose computer, although those skilled in the art will appreciate that programmable or special purpose circuitry and equipment may be used. Service system 114 may be distributed among multiple devices that together comprise elements 701-705.

Communication interface 701 could comprise a network interface, modem, port, transceiver, or some other communication device. Communication interface 701 may be distributed among multiple communication devices. Processing system 702 could comprise a computer microprocessor, logic circuit, or some other processing device. Processing system 702 may be distributed among multiple processing devices. User interface 703 could comprise a voice recognition interface, such as a Voice Extensible Markup Language (VXML) interface, a graphical display, a touch screen, a Short Message Service (SMS) interface, an Unstructured Supplementary Service Data (USSD) interface, or some other type of user interface. User interface 703 may be distributed among multiple user devices. Storage system 704 could comprise a disk, tape, integrated circuit, server, or some other memory device. Storage system 704 may be distributed among multiple memory devices.

Processing system 702 retrieves and executes software 705 from storage system 704. Software 705 may comprise an operating system, utilities, drivers, networking software, and other software typically loaded onto a computer system. Software 705 could comprise an application program, firmware, or some other form of machine-readable processing instructions. When executed by processing system 702, software 705 directs service system 114 to operate as described herein.

User interface 703 receives a request which identifies a service and a first communication device. In response to receiving the request, communication interface 701 transfers the request to a location system, such as location system 112 of FIG. 1. Communication interface 701 then receives a response indicating the location of the first communication device and a second communication device.

Processing system 702 then processes the location of the first communication device and the location of the second communication device to determine if the first communication device is in the vicinity of the second communication device. In response to determining that the first communication device is in the vicinity of the second communication device, user interface 703 transfers a notification to the second communication device indicating that the first communication device is in the vicinity of the second communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   receiving a request that identifies a service, a first communication device, and a second communication device, wherein the request is transmitted from a third communication device;
   determining a location of the first communication device and a location of the second communication device;
   processing the location of the first communication device and the location of the second communication device with a vicinity parameter received in the request to determine if the first communication device is in the vicinity of the second communication device, wherein the request further indicates a tolerance for the vicinity parameter that provides a margin of error for determining if the first communication device is in the vicinity of the second communication device; and in response to determining that the first communication device is in the vicinity of the second communication device, transferring a notification for delivery to the third communication device indicating that the first communication device is in the vicinity of the second communication device.

2. The method of claim 1 further comprising setting a duration for determining the location of the first communication device and the location of the second communication device.

3. The method of claim 2 further comprising sending a notification indicating expiration of the duration.

4. The method of claim 1 further comprising sending a notification indicating a distance between the first communication device and the second communication device.

5. The method of claim 1 further comprising sending a notification indicating all active processing of vicinity determination requests initiated by the third communication device.

6. The method of claim 1 wherein the request includes a start date to commence actively processing the request.

7. The method of claim 1 wherein the request comprises a daily time frame for actively processing the request.

8. The method of claim 1 further comprising transferring a message for delivery to the third communication device that suggests an alternative vicinity parameter.

9. A communication system comprising:

a user interface configured to receive a request that identifies a service, a first communication device, and a second communication device, wherein the request is transmitted from a third communication device;

a location system configured to determine a location of the first communication device and a location of the second communication device; and a processing system configured to process the location of the first communication device and the location of the second communication device with a vicinity parameter received in the request to determine if the first communication device is in the vicinity of the second communication device, wherein the request further indicates a tolerance for the vicinity parameter that provides a margin of error for determining if the first communication device is in the vicinity of the second communication device;

wherein the user interface is further configured to, in response to determining that the first communication device is in the vicinity of the second communication device, transfer a notification for delivery to the third communication device indicating that the first communication device is in the vicinity of the second communication device.

10. The system of claim 9 wherein the user interface is further configured to receive a duration for determining the location of the first communication device and the location of the second communication device.

11. The system of claim 10 wherein the user interface is further configured to send a notification indicating expiration of the duration.

12. The system of claim 9 wherein the user interface is further configured to send a notification indicating a distance between the first communication device and the second communication device.

13. The system of claim 9 wherein the user interface is further configured to send a notification indicating all active processing of vicinity determination requests initiated by the third communication device.

14. The system of claim 9 wherein the request includes a start date to commence actively processing the request.

15. The system of claim 9 wherein the request comprises a daily time frame for actively processing the request.

16. The system of claim 9 wherein the processing system is configured to transfer a message for delivery to the third communication device that suggests an alternative vicinity parameter.

* * * * *